United States Patent [19]

Hoffmann

[11] 4,300,966
[45] Nov. 17, 1981

[54] BASE CUP APPLYING APPARATUS AND METHOD

[75] Inventor: Wolfgang Hoffmann, Turlock, Calif.

[73] Assignee: B & H Manufacturing Company, Inc., Ceres, Calif.

[21] Appl. No.: 84,594

[22] Filed: Oct. 15, 1979

[51] Int. Cl.³ .............................................. C09J 5/00
[52] U.S. Cl. .................................. 156/156; 156/285; 156/293; 156/303.1; 156/356; 156/423; 156/497; 156/556; 156/567; 156/578
[58] Field of Search ...................... 156/293, 294, 303.1, 156/423, 566, 567, 556, 578, 156, 285, 356, 497; 118/318, 319

[56] References Cited

U.S. PATENT DOCUMENTS

| | | | |
|---|---|---|---|
| 3,220,908 | 11/1965 | Brown et al. | 156/556 |
| 3,630,797 | 12/1971 | Mallory et al. | 156/293 X |
| 3,649,409 | 3/1972 | Bell et al. | 156/303.1 |
| 4,016,024 | 4/1977 | Karlsson | 156/578 |
| 4,055,455 | 10/1977 | McDonald et al. | 156/578 |
| 4,132,584 | 1/1979 | Aidlin et al. | 156/578 |
| 4,247,357 | 1/1981 | Kontz | 156/567 |

Primary Examiner—Michael G. Wityshyn
Attorney, Agent, or Firm—Edward B. Gregg

[57] ABSTRACT

Apparatus and method for applying plastic base cups to plastic containers, such plastic containers being blow-molded, having round bottoms and being unable to stand erect, such base cups providing a flat, stable base for the container. Cups are supplied automatically to holders or sockets at a cup receiving station; they are then indexed to an adhesive applying station where a circular line of adhesive is applied to the bottom of the cup by spinning the cup; the cup is then indexed to a container delivery station, where a container is deposited in the cup, and air under pressure is applied to the interior of the container to apply pressure to the glue line, such pressure also acting to smooth out irregularities in the container. Each container-cup assembly is removed at a removal station. Detector means may be employed at or ahead of the adhesive applying station to determine whether a cup is present in a holder. Following the container delivery station, pressure testing, leak testing and/or alignment testing stations may be provided.

9 Claims, 13 Drawing Figures

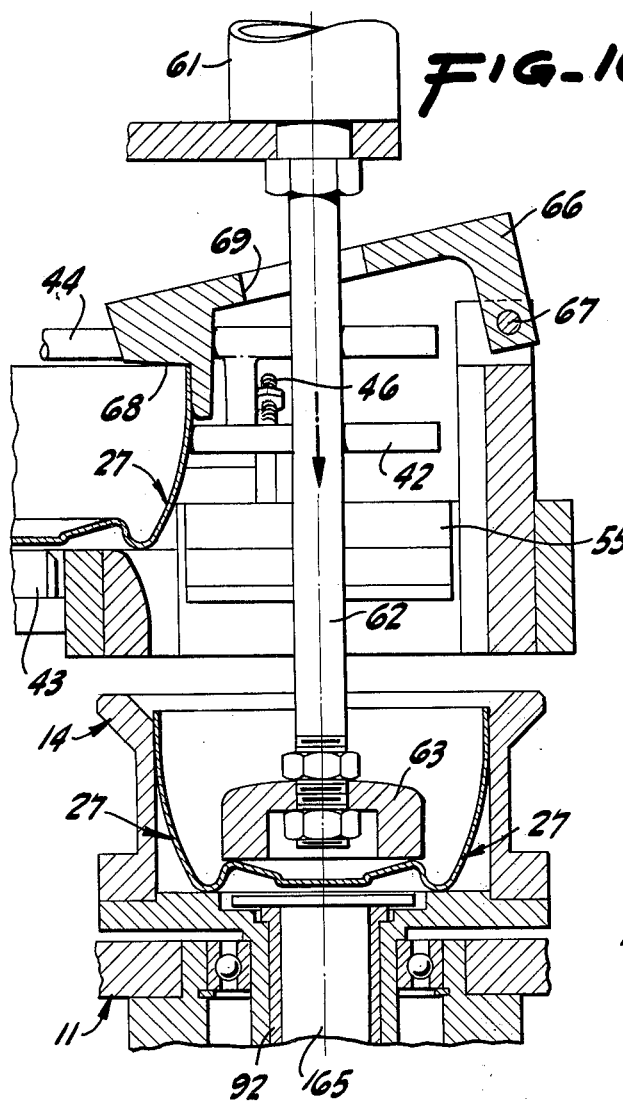
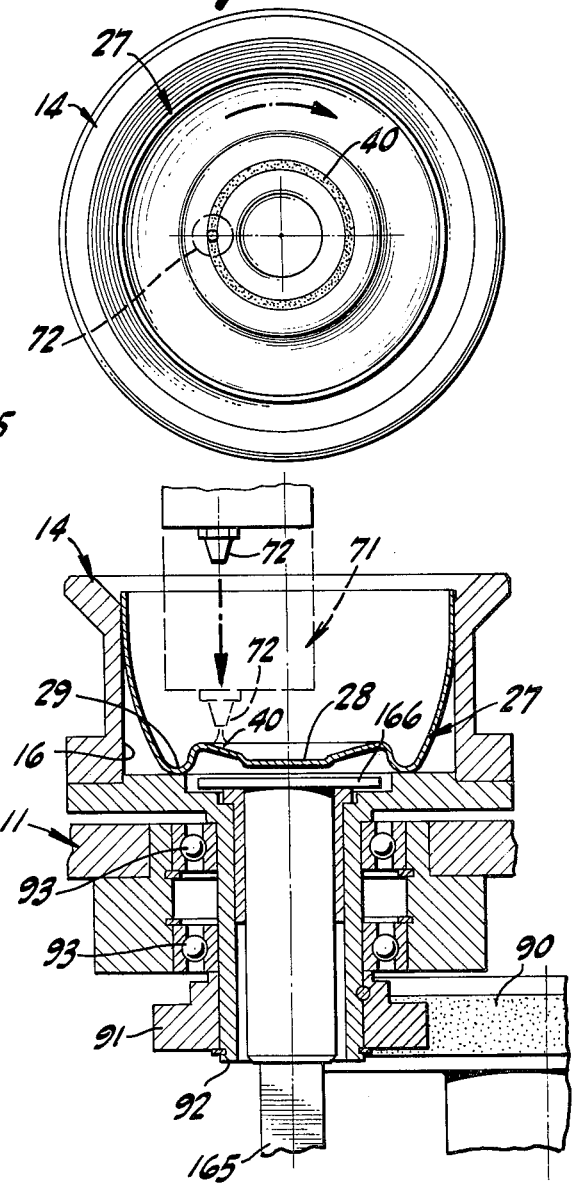
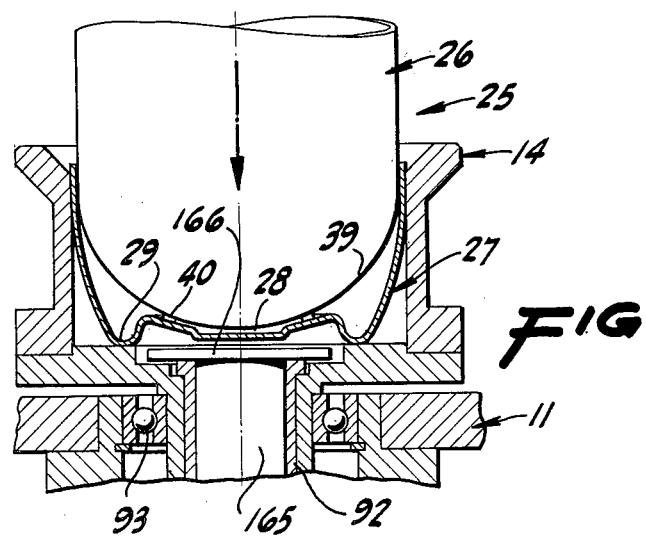

BASE CUP APPLYING APPARATUS AND METHOD

This invention relates to apparatus and method for applying base cups to plastic containers.

Plastic containers for beverages made of polyethylene terephthalate (commonly referred to as PET) are becoming increasingly popular because of their light weight, their strength and capacity to hold beverages including carbonated beverages, their lack of toxicity and the economical materials and methods for their manufacture. Typically, these containers are made by what is called "blow molding", in which air under pressure is used to form the container.

As currently manufactured, blow-molded PET containers have round bottoms such that they will not stand upright. Accordingly, what are known as "base cups" are applied to these containers, such base cups having flattened bottoms which serve to stabilize the container when it is in upright condition. Problems exist in the application of base cups to blow-molded containers at a rapid rate, accurately and with the base cups applied securely to the containers. It is also important for aesthetic reasons, if for no other reason, that the containers be upright in their base cups.

It is an object of the present invention to provide an improved apparatus and an improved method for applying base cups to blow-molded PET containers.

It is a further object of the invention to provide an apparatus and a method whereby base cups can be applied to such containers rapidly, accurately and securely and which will also carry out other operations such as pressure testing, leak testing and testing for proper placement of the containers in their base cups.

These and other objects of the invention will be apparent from the ensuing description and claims.

Although the invention will be described with particular reference to the application of plastic base cups to plastic containers, especially PET containers, it will be appreciated that the invention has other applications.

One embodiment of the invention is shown by way of example in the accompanying drawings in which FIG. 1 is a somewhat diagrammatic plan view of the machine showing the various stations at which several operations are performed.

FIG. 10 is a vertical section taken through the base cup feed station A, showing a base cup being placed in a socket.

FIG. 11 is a top view of a cup showing its interior and the circular pattern of glue as applied thereto at station C.

FIG. 12 is a vertical section through a socket and cup at station C with the adhesive applicator in operating position.

FIG.13 is a section taken through a cup and socket showing the manner in which a base cup is adhered to a container.

Figure 1:
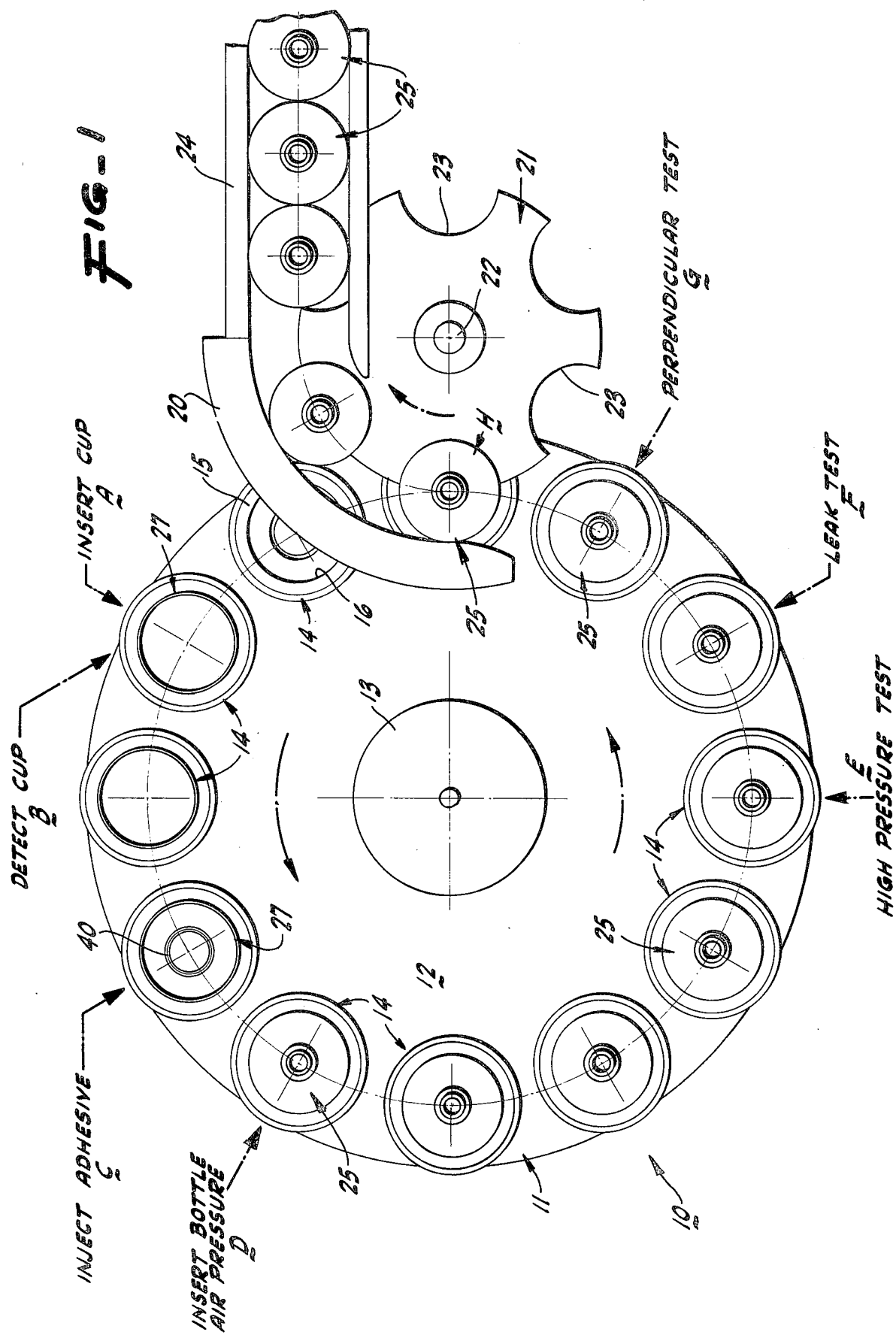

Referring now to the drawings and preliminarily to FIG. 1, the machine is generally designated by the reference numeral 10. It comprises a turret 11 having a plate 12 fixed to a shaft 13. Mounted on the plate are a plurality, twelve in number as shown in FIG. 1, of base cup sockets 14, each with a stepped interior configuration 15 and a central opening 16. The configuration of the interior of sockets 14 is best shown in section in figures such as FIGS. 10 and 12. The bottom portion of a container-cup assembly designated 25, is shown in FIG. 13. Also shown is a curved container guide 20 which guides the container-base cup assemblies out of the machine with the assistance of a star wheel 21 fixed to a shaft 22 and having pockets 23. A guide 24 is provided to guide the container-base cup assemblies away from the machine. The turret 11 is operated intermittently. The several stations mentioned above in the general description of the drawings are station A at which a base cup is inserted in a socket 14, station B at which the presence or absence of a cup is detected, station C at which adhesive is applied to a cup, and station D at which a container is inserted and air under pressure is applied to the interior of the bottle after it is seated in a cup for the purpose of properly shaping the container and for achieving a tight, secure bond at the glue line. The next three stations are idle stations which allow the adhesive to cool and harden. The next station is a pressure testing station E, the purpose of which is to apply air pressure suficient to test the strength of the container and it is followed by a leak testing station F at which air under pressure is admitted and the presence or absence of a leak is detected. At station G the alignment of the container and base cup is sensed to determine whether the alignment is proper. At station H the container-base cup assembly 25 is removed by the star wheel 21 and the guide 20.

Referring to FIG. 13 for a view of a container 26 and the base cup 27, which together form the assembly 25, the cup 27 has a concave bottom portion 28 formed with an annular rim 29 projecting downwardly. The container 26 (see FIG. 7) has a body portion 35, a tapered neck portion 36, a flange 37, a tip 38, and a rounded, e.g. semi-spherical, bottom 39. As will be seen in FIG. 13, the rounded bottom 39 is adhered by a glue line 40 to the interior of the base cup 27.

Figure 2:
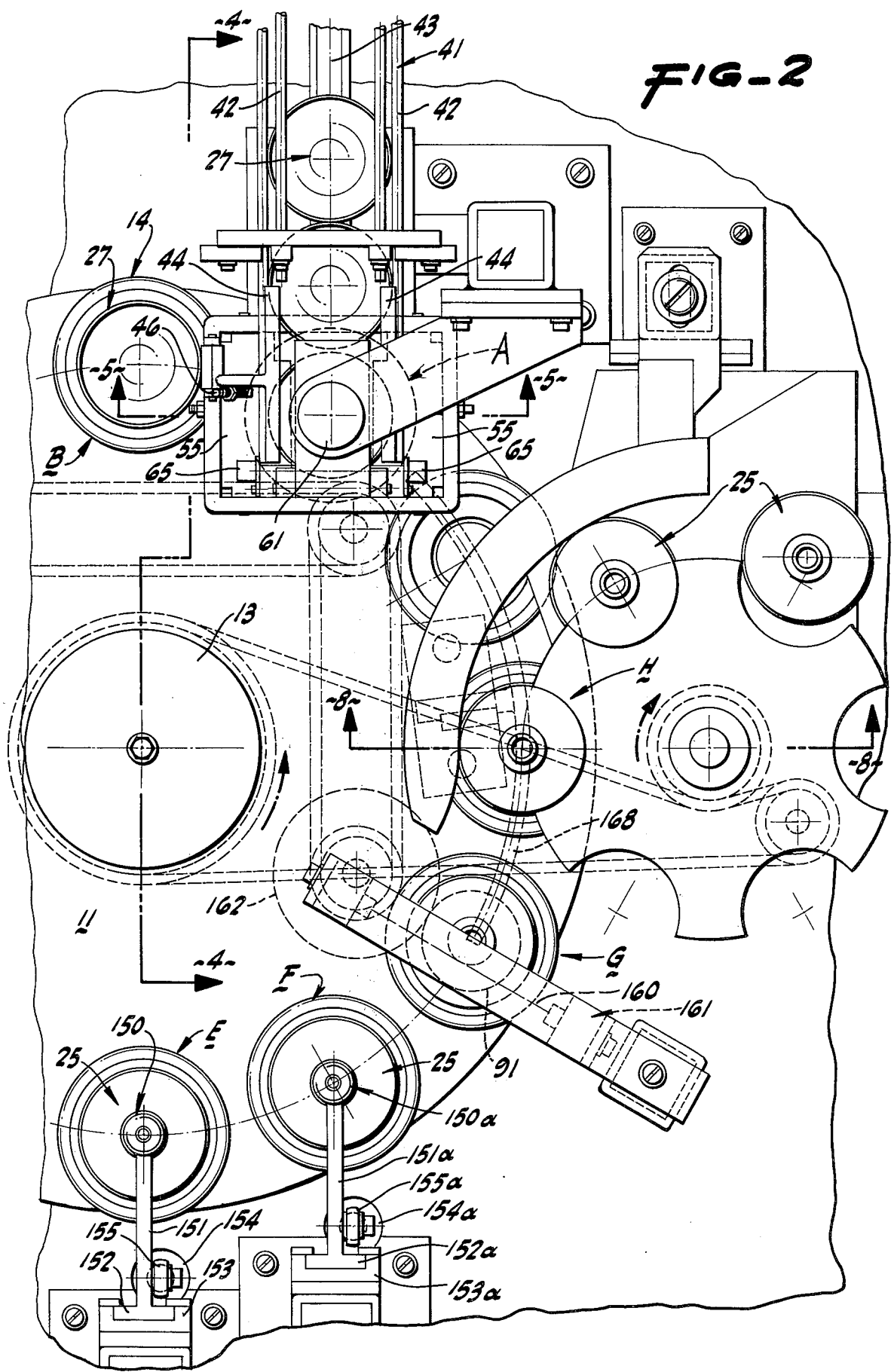
FIG. 2 is a top plan view of the right hand portion of the machine as viewed in FIG. 1 and showing the cup insertion station A and an idle station B, also showing the high pressure testing station E, the leak testing station F, the alignment station G and the container removal station H.
Figure 4:
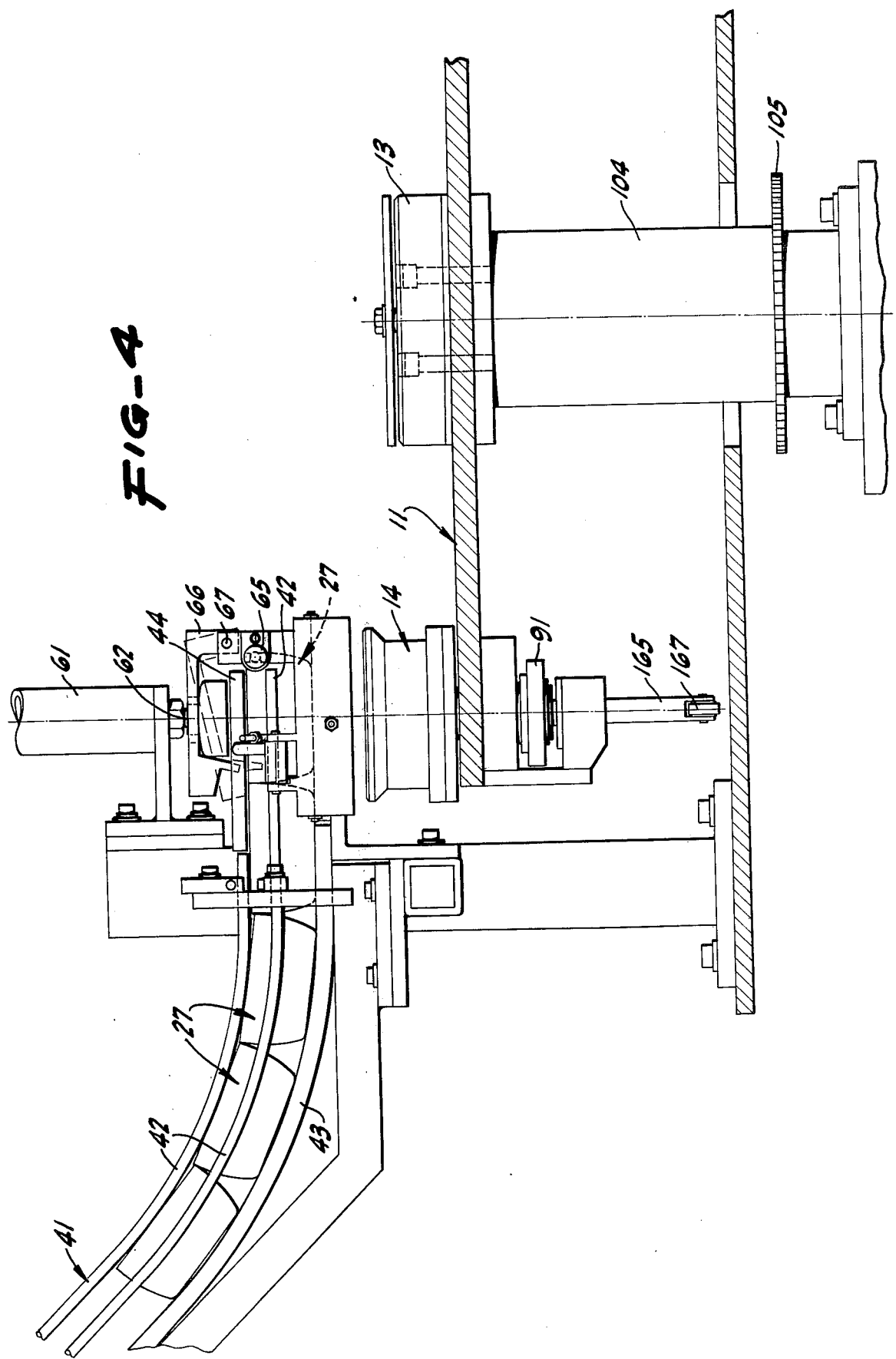
FIG. 4 is a view is side elevation and partly in vertical section taken along the line 4—4 of FIG. 2 showing the cup detector station B.
Figure 5:
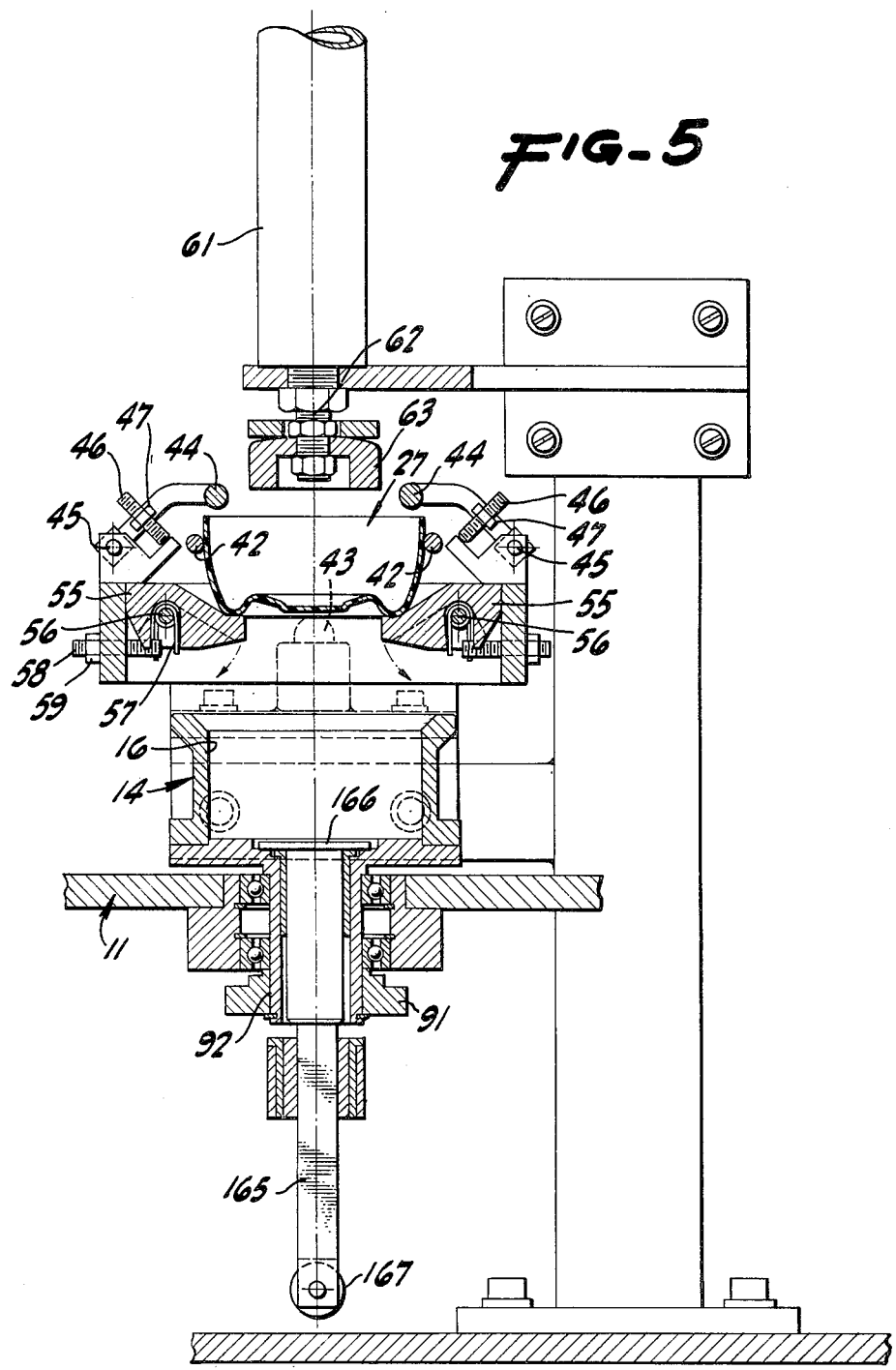
FIG. 5 is a section taken along the line 5—5 of FIG. 2, showing the cup insertion station A.

Referring now to FIGS. 2, 4, and 5, base cups 27 are moved by gravity and are guided to station A by guide cage 41 including rods 42 and a guide bar 43. Rods 44, one on each side of the cup (FIG. 5) are pivoted at 45 on a frame bracket and their positions are adjustable by means of screws 46 threaded through nuts 47. These rods can be pivoted out of the way for access, for example, to remove a damaged base cup. The base cup is 27 seated on pivoted supports 55 which are pivotally mounted at 56 and are biased upward by springs 57 whose tension can be adjusted by screws 58 which are threaded through nuts 59. An hydraulic cylinder 61 has a rod 62 having at its lower end a contact number 63. At the proper time when a base cup is in position and seated on supports 55 at station A, the rod 61 is extended to force the base cup downwardly against the force of the springs 57, thereby causing them to separate and allowing the base cup to enter the respective socket 14 where it assumes the position shown in FIG. 10, resting on the upper ledge of the stepped bottom of the socket.

Referring to FIG. 4 a cup detector 65 is provided to detect whether a cup is in position for delivery to a socket. Such detector may comprise, for example, a photo-electric device whose beam is interrupted by the presence of a cup, but is not interrupted if a cup is absent. The former condition (cup present, light beam interrupted), by suitable control mechanism, allows the cyliner 61 to operate. Such control mechanisms are well known in the art. The detector senses that a cup is absent and the cylinder 61 is inactivated. Also as shown in FIG. 10 a keeper member 66 is provided pivoted at 67, having a weighted free end and formed with a notch 68 and with a clearance hole 69. When the member 63 descends to the position shown in FIG. 10 it allows the keeper 66 to drop down and causes its notch 68 to engage the next cup in line, thereby holding it back and preventing its further forward movement until the member 63 ascends again, raises the keeper 66 and allows the next cup to drop into place.

At station C (or alternatively at idle station B) a cup detector similar to that at station A is provided to detect again the presence or absence of a cup in a holder 14. If a cup is detected, as by interruption of a light beam, the mechanism hereinafter described for operating the adhesive applicator is caused to operate when the respective cup reaches the station C and the mechanism described hereinafter for depositing a container in a cup is caused to operate when the respective cup reaches station D. If the absence of a cup is detected such mechanisms are inactivated for the respective empty holder when it reaches station C and again when it reaches station D. Suitable control equipment which may be mechanical, electromechanical or electronic and which preferably includes a microprocessor to activate/inactivate at the proper time are well known in the art.

Figure 3:
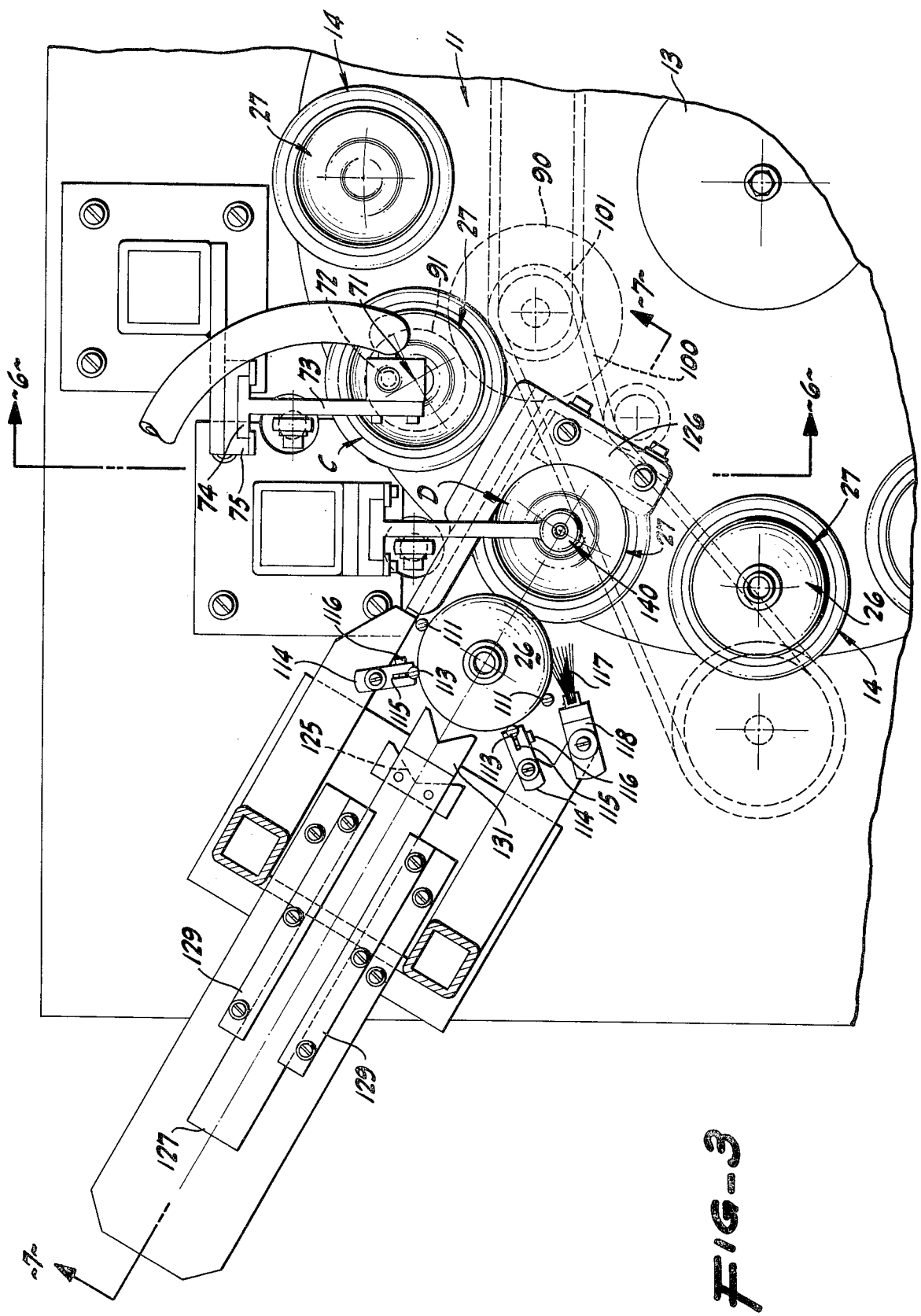
FIG. 3 is a continuation of FIG. 2 on the left hand side of the machine as viewed in FIG. 1 and it shows the adhesive injection station C and the container insert and pressurizing station D.
Figure 6:
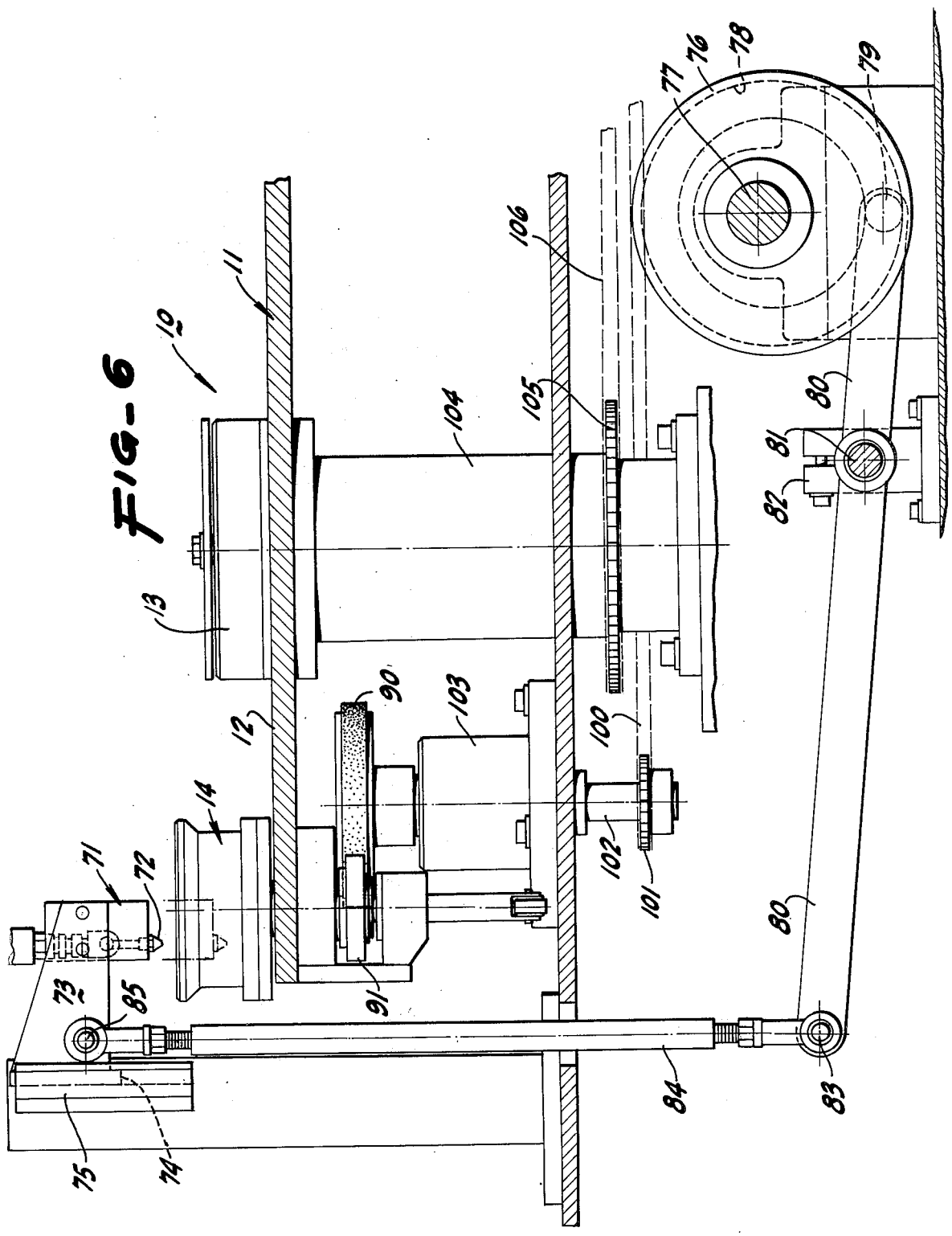
FIG. 6 is a section along the line 6—6 of FIG. 3, showing the adhesive applicator station C.

Referring now to FIGS. 3, 6 and 12, an adhesive applicator 71 is shown having a nozzle 72 carried by a socket 73 fixed to a slide 74, mounted for sliding movement in gibs 75 on the frame of the machine. The slide, and with it the adhesive applicator, are operated by a cam 76 on a cam shaft 77, such cam having a cam groove 78 in which a cam follower roller 79 rides. The follower 79 is mounted on one end of a lever 80 which is pivoted at 81 on a bracket 82. The other end of the lever 80 is pivotally connected at 83 to an adjustable vertical rod 84 which is pivotally connected at 85 to the bracket 73. In FIG. 12, the adhesive applicator is shown in operating position close to the bottom of a base cup 27. The base cup is caused to spin by a friction wheel 90 bearing against a wheel 91 fixed to a hollow shaft 92 whose upper end is fixed to the socket 14. Bearings 93 allow such rotation. The nozzle applies a line of glue to the bottom of cup 27 shown at 40 in FIG. 11. Then the adhesive applicator is withdrawn and the turret indexes another 30° to bring the base cup with its glue line 40 to station D. The wheel 90 is continuously rotated (see FIG. 6) by suitable means such as a chain 100, a sprocket 101, a shaft 102, and a gear reduction device 103. FIG. 6 also shows the turret drive which includes drive motor (not shown) which through suitable gears and an indexing mechanism of known construction drive shaft 104 and turret 12 intermittently. The motor rotates continuously, the intermittent indexing being caused by the indexing mechanism. A sprocket 105 and chain 106 drive the star wheel 21 giving it an intermittent indexing motion.

Figure 7:
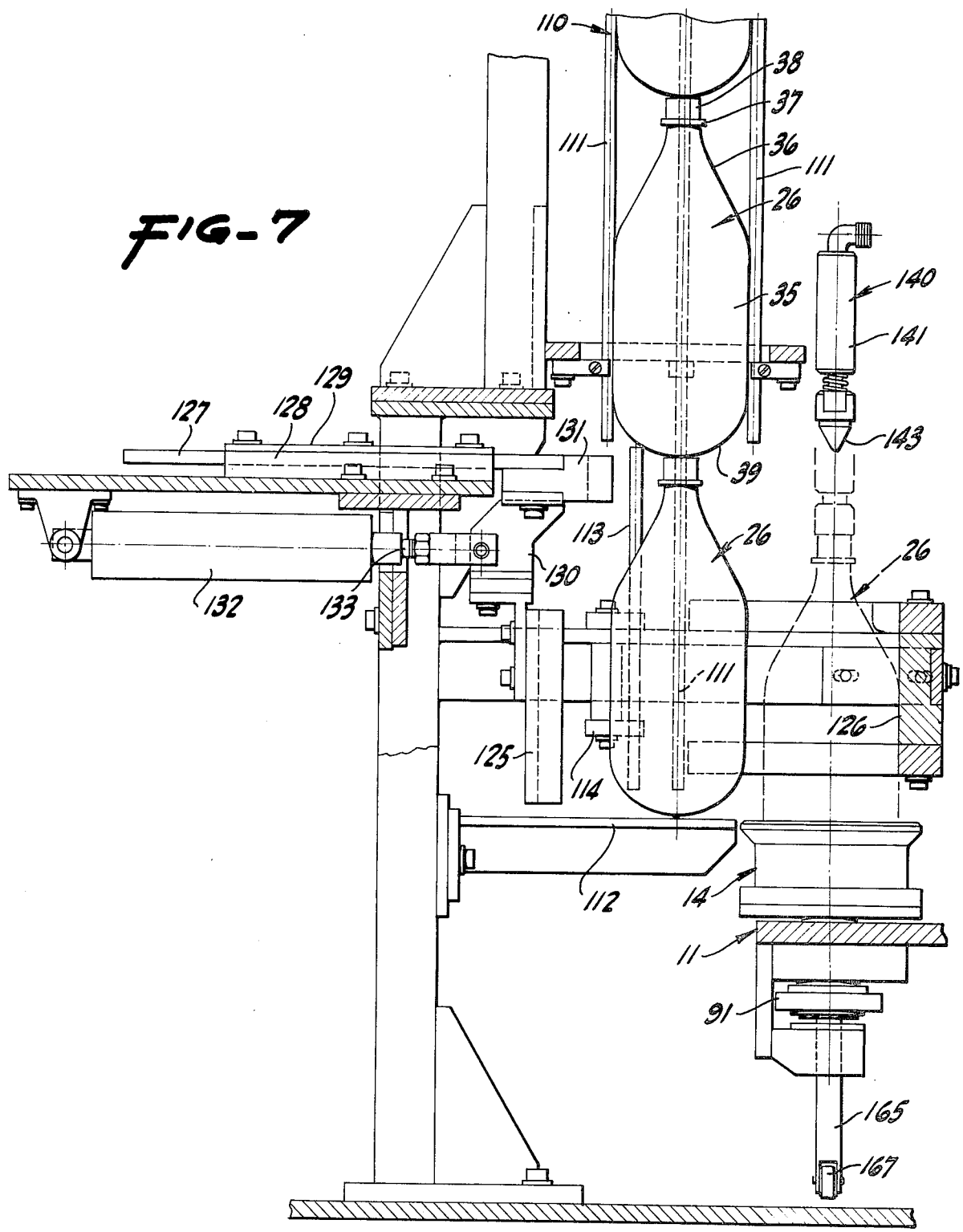
FIG. 7 is a section taken along the line 7—7 of FIG. 3 showing the container feed station D where containers are supplied to the base cups.
Figure 9:
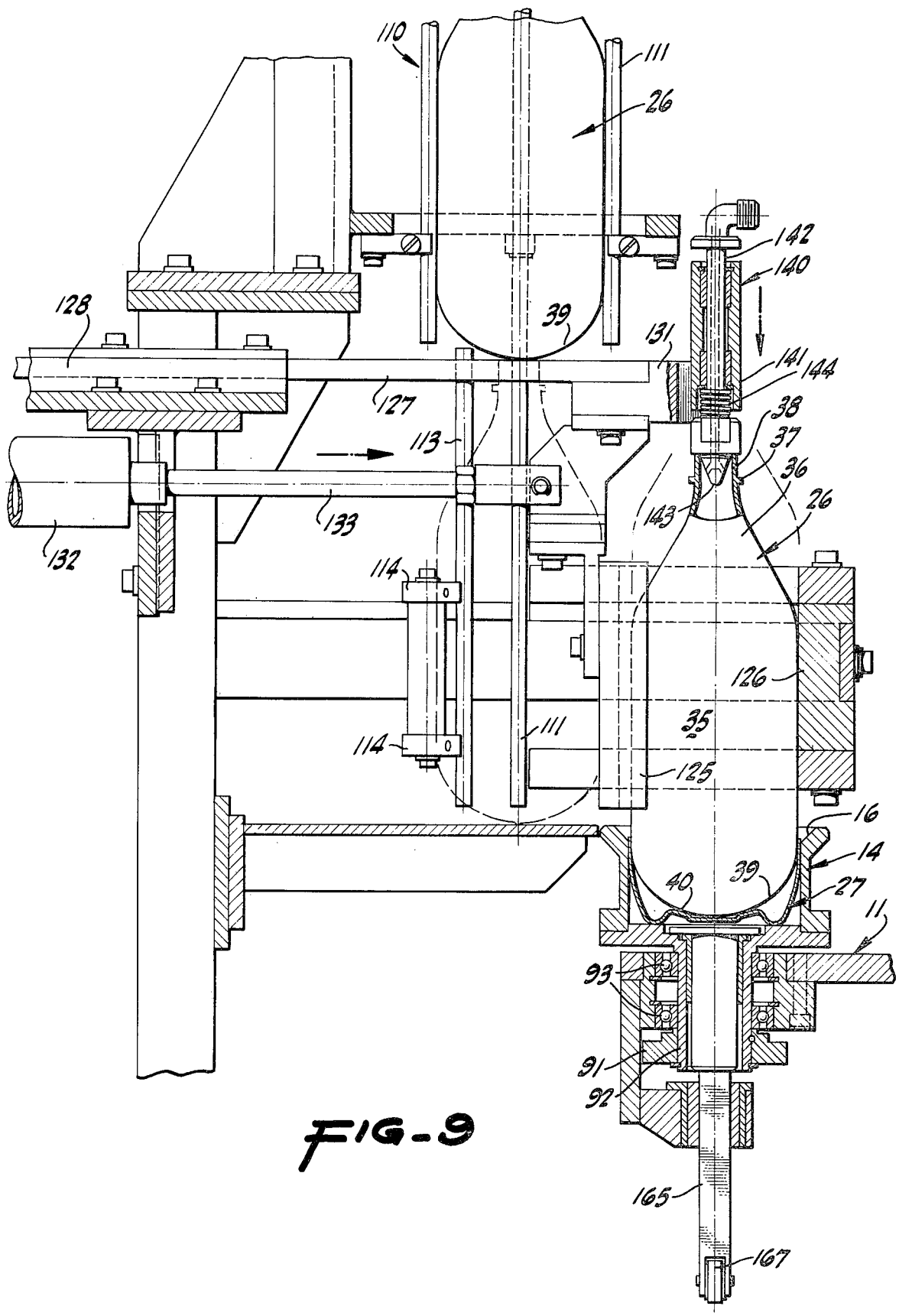
FIG. 9 is similar to FIG. 7 but shows an assembled container and base cup with a nozzle in place for application of air under pressure.

Referring now to FIGS. 3, 7 and 9, at station D a container 26 is applied to a base cup 27 located in a socket 14 and having a glue line 40 applied to interior. At station D air pressure is also applied to the interior of the container when it is seated in a cup to act as a pressure medium to being the bottom of the container into firm contact with the glue line 40. This air pressure also acts to smooth the surface of the container and to remove or diminish irregularities in the shape of the container. A vertical container guide 110 is formed by spaced rods 111, two of which continue farther down than the others. The other rods terminate at a higher level for clearance purposes. To provide lateral support in this lower region just above a support plate 112 (which provides bottom support for the lowermost container 26), rods 113 are provided which are mounted on brackets 114 which are split at 115 to receive the rods. Screws 116 are provided to clamp the rods 113 in place. A further yielding lateral support is provided by a brush 117 mounted on a bracket 118. As a container is pushed forwardly (to the right as viewed in FIG. 3) the brush 117 will yield, allowing the container to move and will spring back into its normal supporting position when the container passes it by. This brush may be made of nylon or other suitable material which will not scratch the surface of the container. When a container has been pushed forwardly it is gripped momentarily between a lower pusher member 125 and a stationary plate 126. Alternatively a pivoted spring loaded and adjustable guide rod may be employed instead of a brush.

The pushing mechanism comprises a slide 127 slidable in guide 128 and gibs 129. To the forward end (the right hand end as viewed in FIGS. 7 and 9) of the slide 127 is attached a bracket assembly 130 to which a lower pusher member 125 and an upper pusher member 131 are attached, each having a notched portion to engage the container. The upper pusher 131 contacts the neck of the container and the lower pusher 125 contacts the body of the container as best shown in FIG. 9. These pushers are operated in unison by an hydraulic cylinder 132 having a rod 133 which is connected to the bracket assembly 130. As will be seen in FIG. 9, the upper pusher extends further forwardly than the lower pusher to take into account the different diameters of the neck and of the body of the container.

When a container has been pushed forwardly to the position shown in broken lines in FIG. 9, it is gripped between the lower pusher 125 and a stationary plate 126. At this moment an air pressure applicator 140 is lowered into operating position. The applicator 140 comprises a sleeve 141 through which an air conduit 142 extends to the bottom of which is connected a nozzle 143. When the applicator descends, the nozzle enters the neck of the container and continued downward movement pushes the container downwardly between the pusher 125 and the plate 126 and into the cup 27 where its round bottom 39 seats in the concave bottom of the cup and is brought into firm contact with the glue line 40. The spring 144 which forms a part of the assembly 140 is compressed and an air-tight seal is formed. Air under pressure, for example 80 psi gauge, performs the double function of applying pressure to the glue line and of smoothing out irregularities in the shape of the container.

The container-base cup assembly then passes by increments through three idle stations to station E where air under high pressure is applied. Should a container fail, through suitable and known types of control equipment including a microprocessor memory, the failed container-base assembly is removed and discarded at a convenient point downstream. For example, the pneumatic system employed to pressure the container may include a pressure sensitive switch which upon a sudden drop of pressure due to failure, activates the control equipment. The mechanism for applying air pressure is similar to that shown in FIG. 9 and described herein above with reference to station D. Thus, referring to FIG. 2, a tube, nozzle and air tube assembly 150 is provided which is carried by a bracket 151 fixed to a slide 152, slidable in a channel 153. An hydraulic cylinder 154 is connected at 155 to the bracket 151. The sequence of operation—lowering of the nozzle into the neck of a container, application of air pressure sufficient to accomplish testing and withdrawal of the nozzle—will be apparent from the description of similar apparatus at station D.

The container-cup assembly is then moved to station F where similar apparatus (reference numbers being the same but with the letter "a" added) applies pressure to test for leaks. Leakage is detected by suitable means, e.g., a pressure operated switch, and by means of suitable control equipment a leaky container-base cup assembly is removed downstream.

Still referring to FIG. 2, the container-cup assembly is next moved to station G where it is sighted by a beam 160 generated by a photo-electric device 161, such beam being aimed so that it just misses the neck of the container if it is erect and properly seated in the base cup. The container-cup assembly is caused to spin by a friction wheel 162 which engages the wheel 91 on hollow shaft 92. If the container is not properly seated and leans beyond an allowable limit from the perpendicular, during its rotation it will obstruct the beam 160 which constitutes a signal which, by means of suitable control equipment, causes the container-base cup assembly to be removed downstream.

Figure 8:
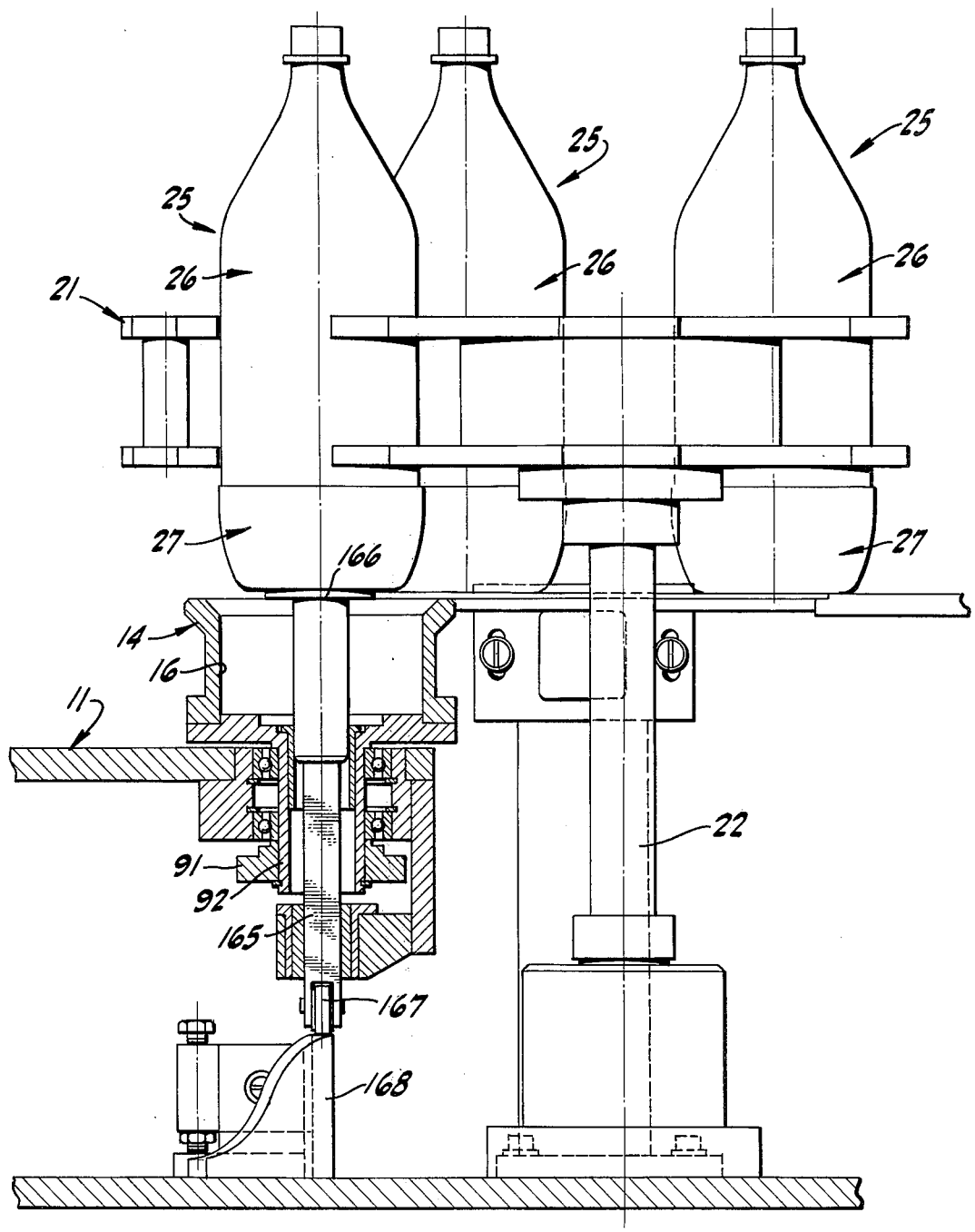
FIG. 8 is a section along the line 8—8 of FIG. 2, showing the container-base cup assembly removal station.

The container-cup assembly is then moved to station H. Referring to FIG. 8 and to FIG. 12, a rod 165 extends through hollow shaft 92 and has a disk 166 at its upper end and a roller 167 at its lower end. During movement from station A through station G, the roller 167 is out of contact with any other mechanism and is idle, but at station H it contacts a cam 168 mounted on the frame of the machine. This cam has a profile such that it lifts the roller 167, the rod 165, and the disk 166 and with them the container-cup assembly to the elevated position shown in FIG. 8, where it is picked up by a pocket 23 of the star wheel 21 and is guided by curved guide 20 and the star wheel to outlet guide 24.

As will be apparent to one skilled in the art, the various steps in operation of the apparatus will be synchronized by suitable equipment such as cams and other mechanical devices, electro-mechanical devices and electronic equipment. The adhesive may be a hot melt glue or a cold setting adhesive.

It will, therefore, be apparent that novel and advantageous apparatus and method for applying base cups to containers have been provided.

I claim:

1. A machine for applying cups to the bottoms of containers which have rounded botoms such that they are unstable when placed in upright position, the cups having bottoms which are sufficiently flat to be stable in upright position, said machine comprising:
    (a) a rotary transport rotatable about a vertical axis,
    (b) a plurality of upwardly open cup holders mounted on the transport for rotation with the transport about such vertical axis, such holders being spaced from one another and lying on a circle which is concentric to such vertical axis, each such holder having a bottom providing bottom support and a side wall providing lateral support for a cup,
    (c) means for intermittently rotating the transport about its vertical axis whereby each holder is indexed in turn from a cup receiving station to an adhesive applying station, thereafter to a container applying station and thereafter back to the cup receiving station, such means acting to cause a dwell at each such station between intervals of indexing motion,
    (d) cup delivery means at the cup receiving station acting, during a dwell, to deliver a cup from a supply thereof to the holder at such station,
    (e) adhesive applying means at the adhesive applying station acting, during a dwell, to apply adhesive to the interior surface of the bottom of a cup at such station,
    (f) container applying means at the container applying station acting, during a dwell, to deliver a container from a supply thereof to the cup in the holder at such station, such delivery being from above the holder and cup, such container applying means acting also to apply pressure to the cup and container in an axial direction to securely bond the bottom of the container to the adhesive in the bottom of the cup, and
    (g) means for extracting each cup and container from the transport after the cup and container leave the container applying station.

2. The machine of claim 1 wherein the cup delivery means includes a cup support above the holder which receives a cup and holds it above the holder but which yields to a vertically applied force to allow a cup to drop into the holder, and means located above the cup support acting to apply such a force and to deliver the cup to a holder.

3. The machine of claim 1 wherein said adhesive applying means includes a nozzle for applying adhesive to a cup, means normally supporting the nozzle above the cup but acting automatically during a dwell to cause the nozzle to enter the cup into close proximity to the bottom of the cup, to apply adhesive to the bottom of the cup and then to retract from the cup.

4. The machine of claim 1 wherein said container applying means includes a horizontal container support for supporting a container above and radially outwardly of the holder and cup at the container applying station, means for moving such container radially inwardly off the support and for momentarily clamping it in a position above the cup and holder and pusher means acting downwardly on the top of the container to force it down into the cup.

5. The machine of claim 4 wherein such pusher means also includes a nozzle connected to a supply of compressed air, such nozzle being normally resiliently held in closed position to prevent the outflow of air but acting upon entry into the top opening of the container to seal such opening and to supply compressed air to the interior of the container.

6. A machine of claim 1 wherein each cup holder is rotatably mounted for spinning about its individual axis parallel to said vertical axis, and spinning means is provided at the adhesive applying station to spin each holder and cup during its dwell at such station and while adhesive is being applied to the cup.

7. A method of applying round bottom containers to flat bottom cups which comprises:
   (a) providing a horizontal, rotary cup transport rotatable about a vertical axis and having a plurality of cup holders spaced apart and lying on a circle concentric to such vertical axis,
   (b) providing also (1) cup delivery means at a cup delivery station adapted to supply cups, in sequence, to cup holders at such station, (2) adhesive applying means at an adhesive applying station spaced from the cup delivery station and adapted to apply adhesive, in sequence, to the interior bottoms of cups at an adhesive applying station, and (3) container applying means at a container applying station spaced from the adhesive applying station and adapted to deliver containers, in sequence, to cups at the container delivery station and to apply axial pressure to the containers to securely bond them to the cups; said delivery means (1) and applying means (2) and (3) acting from above the cup holder.
   (c) rotating the transport intermittently such that each holder, in turn, is rotated to each such station starting with the cup delivery station, then to the adhesive station and then to the container applying station, and each cup is caused to undergo a dwell at each such station,
   (d) operating the respective cup delivery, adhesive applying and container delivery means during such dwell to supply a cup to a holder at the cup delivery station, to apply adhesive to the interior bottom of a cup at the cup applying station and to apply a container at the container applying station and also to apply axial pressure to bond the container firmly to the cup; and
   (e) extracting from the transport each container-cup assembly.

8. The method of claim 7 wherein each cup holder is caused to spin at the adhesive applying station while adhesive is being applied.

9. The method of claim 7 wherein air under pressure is supplied to the interior of the container as it is subjected to axial pressure.

* * * * *